(12) United States Patent
Macchia

(10) Patent No.: US 9,957,807 B2
(45) Date of Patent: May 1, 2018

(54) ROTOR ASSEMBLY WITH SCOOP

(71) Applicant: Pratt & Whitney Canada Corp., Longueuil (CA)

(72) Inventor: Enzo Macchia, Kleinburg (CA)

(73) Assignee: PRATT & WHITNEY CANADA CORP., Longueuil, Quebec ( * ) Notice: Subject to any disclaimer, the term of this patent is extended or adjusted under 35 U.S.C. 154(b) by 358 days.

(21) Appl. No.: 14/694,032

(22) Filed: Apr. 23, 2015

(65) Prior Publication Data

US 2016/0312618 A1 Oct. 27, 2016

(51) Int. Cl.
| F01D 11/08 | (2006.01) |
| F01D 5/16 | (2006.01) |
| F02C 3/04 | (2006.01) |
| F01D 11/12 | (2006.01) |

(52) U.S. Cl.
CPC .............. F01D 5/16 (2013.01); F01D 11/122 (2013.01); F02C 3/04 (2013.01); F05D 2220/32 (2013.01)

(58) Field of Classification Search
CPC .......... F01D 5/165; F01D 1/122; F01D 11/08; F01D 11/10; F01D 25/04; F01D 25/06; F01D 5/10; F01D 5/148; F01D 5/16; F02C 3/04
USPC ....................................................... 415/182
See application file for complete search history.

(56) References Cited

U.S. PATENT DOCUMENTS

| 3,333,794 | A | 8/1967 | Gordon |
| 3,610,262 | A | 10/1971 | Wise et al. |
| 3,819,008 | A | 6/1974 | Evans et al. |
| 3,937,590 | A | 2/1976 | Mani |
| 4,076,454 | A | 2/1978 | Wennerstrom |
| 4,104,002 | A | 8/1978 | Ehrich |
| 4,254,619 | A | 3/1981 | Giffin et al. |
| 4,354,346 | A | 10/1982 | Wooding |
| 4,354,804 | A | 10/1982 | Cruzen |
| 4,844,692 | A | 7/1989 | Minkkinen et al. |
| 5,275,531 | A | 1/1994 | Roberts |
| 5,365,731 | A | 11/1994 | Nikkanen et al. |
| 5,474,417 | A | 12/1995 | Privett et al. |

(Continued)

FOREIGN PATENT DOCUMENTS

| CN | 101922312 | 12/2010 |
| DE | 102012003902 | 6/2013 |

(Continued)

OTHER PUBLICATIONS

U.S. Appl. No. 14/493,758, filed Sep. 23, 2014.
U.S. Appl. No. 14/493,785, filed Sep. 23, 2014.

*Primary Examiner* — Logan Kraft
*Assistant Examiner* — Sabbir Hasan
(74) *Attorney, Agent, or Firm* — Norton Rose Fulbright Canada

(57) ABSTRACT

A rotor assembly having a plurality of scoops disposed in a circumferential array, the scoops extending from an inner surface of the outer wall of the flow path along a radial distance smaller than a radial distance between the inner and outer walls of the flow path. Each of the scoops forms a closed channel from an inlet to an outlet with the inlet and outlet being axially spaced from one another, the outlet being upstream of and adjacent the annular blade path. A gas turbine engine and method of reducing tip vortices in a rotor assembly are also discussed.

17 Claims, 4 Drawing Sheets

(56) References Cited

U.S. PATENT DOCUMENTS

| | | | |
|---|---|---|---|
| 5,489,186 A * | 2/1996 | Yapp | F01D 5/141 415/208.3 |
| 5,607,284 A | 3/1997 | Byrne et al. | |
| 5,628,622 A | 5/1997 | Thore et al. | |
| 5,762,470 A * | 6/1998 | Gelmedov | F04D 29/4213 415/119 |
| 6,179,551 B1 | 1/2001 | Sathianathan et al. | |
| 6,227,794 B1 | 5/2001 | Wojtyczka et al. | |
| 6,508,624 B2 | 1/2003 | Nadeau et al. | |
| 6,514,039 B1 | 2/2003 | Hand | |
| 6,540,478 B2 | 4/2003 | Fiala et al. | |
| 6,655,632 B1 | 12/2003 | Gupta et al. | |
| 7,118,331 B2 | 10/2006 | Shahpar | |
| 7,444,802 B2 | 11/2008 | Parry | |
| 7,665,964 B2 | 2/2010 | Taylor et al. | |
| 7,797,944 B2 | 9/2010 | Morford et al. | |
| 7,861,823 B2 | 1/2011 | Prasad et al. | |
| 7,914,251 B2 | 3/2011 | Pool et al. | |
| 8,046,915 B2 | 11/2011 | Xie et al. | |
| 8,186,942 B2 | 5/2012 | Haas | |
| 8,366,047 B2 | 2/2013 | Euvino, Jr. et al. | |
| 8,403,624 B2 | 3/2013 | Xie et al. | |
| 8,461,713 B2 | 6/2013 | Sammy | |
| 8,636,464 B2 | 1/2014 | Bottome | |
| 8,756,909 B2 | 6/2014 | Avery | |
| 2011/0164967 A1 | 7/2011 | Elorza Gomez et al. | |
| 2012/0087787 A1 | 4/2012 | Brown | |
| 2012/0240594 A1 | 9/2012 | Shamara | |
| 2012/0263587 A1 | 10/2012 | Hergt et al. | |
| 2013/0045370 A1 | 2/2013 | Aho et al. | |
| 2013/0153456 A1 | 6/2013 | Zhu et al. | |
| 2013/0202424 A1 | 8/2013 | Lussier et al. | |
| 2014/0010638 A1 | 1/2014 | Perrot et al. | |
| 2014/0030071 A1 * | 1/2014 | Leslie | F01D 11/122 415/173.1 |
| 2014/0286768 A1 | 9/2014 | Boniface et al. | |
| 2015/0260051 A1 | 9/2015 | Gallagher et al. | |
| 2016/0084162 A1 | 3/2016 | Abrari et al. | |
| 2016/0084265 A1 | 3/2016 | Yu et al. | |
| 2016/0312618 A1 | 10/2016 | Macchia | |
| 2016/0312641 A1 | 10/2016 | Macchia | |
| 2017/0145840 A1 | 5/2017 | Di Mare et al. | |
| 2017/0145959 A1 | 5/2017 | Baralon | |
| 2017/0147741 A1 | 5/2017 | Di Mare et al. | |
| 2017/0152861 A1 | 6/2017 | Japikse | |
| 2017/0248156 A1 | 8/2017 | Parker et al. | |

FOREIGN PATENT DOCUMENTS

| | | |
|---|---|---|
| EP | 1956247 | 8/2008 |
| GB | 623142 | 5/1949 |
| GB | 2405184 | 2/2005 |
| JP | 2000095195 | 4/2000 |
| WO | 9809066 | 3/1998 |
| WO | 02/29224 | 4/2002 |
| WO | 20140023891 | 2/2014 |

* cited by examiner

US 9,957,807 B2

ROTOR ASSEMBLY WITH SCOOP

TECHNICAL FIELD

The application relates generally to rotor assemblies, and more specifically, to such assemblies including flow diverting devices.

BACKGROUND OF THE ART

Engine fan flutter can be caused by shocks at the blade tips and tip vortices created in the flow adjacent the blade tips. Flutter is typically undesired in a gas turbine engine or in other rotary machines, and can occur in blades of various types of rotor assemblies such as fan blades, compressor blades, turbine blades, and the like.

SUMMARY

In one aspect, there is provided a gas turbine engine comprising: concentric inner and outer walls enclosing an annular flow path; a plurality of rotatable extending radially across the annular flow path, the blades defining an annular blade path upon rotation with an annular gap being radially defined between the annular blade path and the outer wall; and a plurality of scoops disposed in a circumferential array, the scoops extending from an inner surface of the outer wall along a radial distance smaller than a radial distance between the inner and outer walls, each of the scoops having an inlet and an opposed outlet axially spaced from one another, the outlet of each of the scoops being upstream of and adjacent the annular blade path.

In another aspect, there is provided a rotor assembly comprising: concentric inner and outer walls enclosing an annular flow path; a plurality of rotatable blades extending radially across the annular flow path, the blades defining an annular blade path upon rotation with an annular gap being radially defined between the annular blade path and the outer wall; and a plurality of scoops disposed in a circumferential array, the scoops extending from an inner surface of the outer wall along a radial distance smaller than a radial distance between the inner and outer walls, each of the scoops forming a closed channel from an inlet to an outlet with the inlet and outlet being axially spaced from one another, the outlet of each of the scoops being upstream of and adjacent the annular blade path.

In another aspect, there is provided a method of reducing tip vortices in a rotor assembly having an array of blades rotatable in an annular flow path surrounded by an outer wall, the method comprising : separating an outer portion of a flow through the annular flow path from a central portion of the flow, the outer portion of the flow circulating along the annular outer wall; and deflecting the outer portion of the flow circumferentially toward an orientation of chords of the blades in a location immediately upstream of the blades.

DESCRIPTION OF THE DRAWINGS

Reference is now made to the accompanying figures in which.

DETAILED DESCRIPTION

Figure 1:
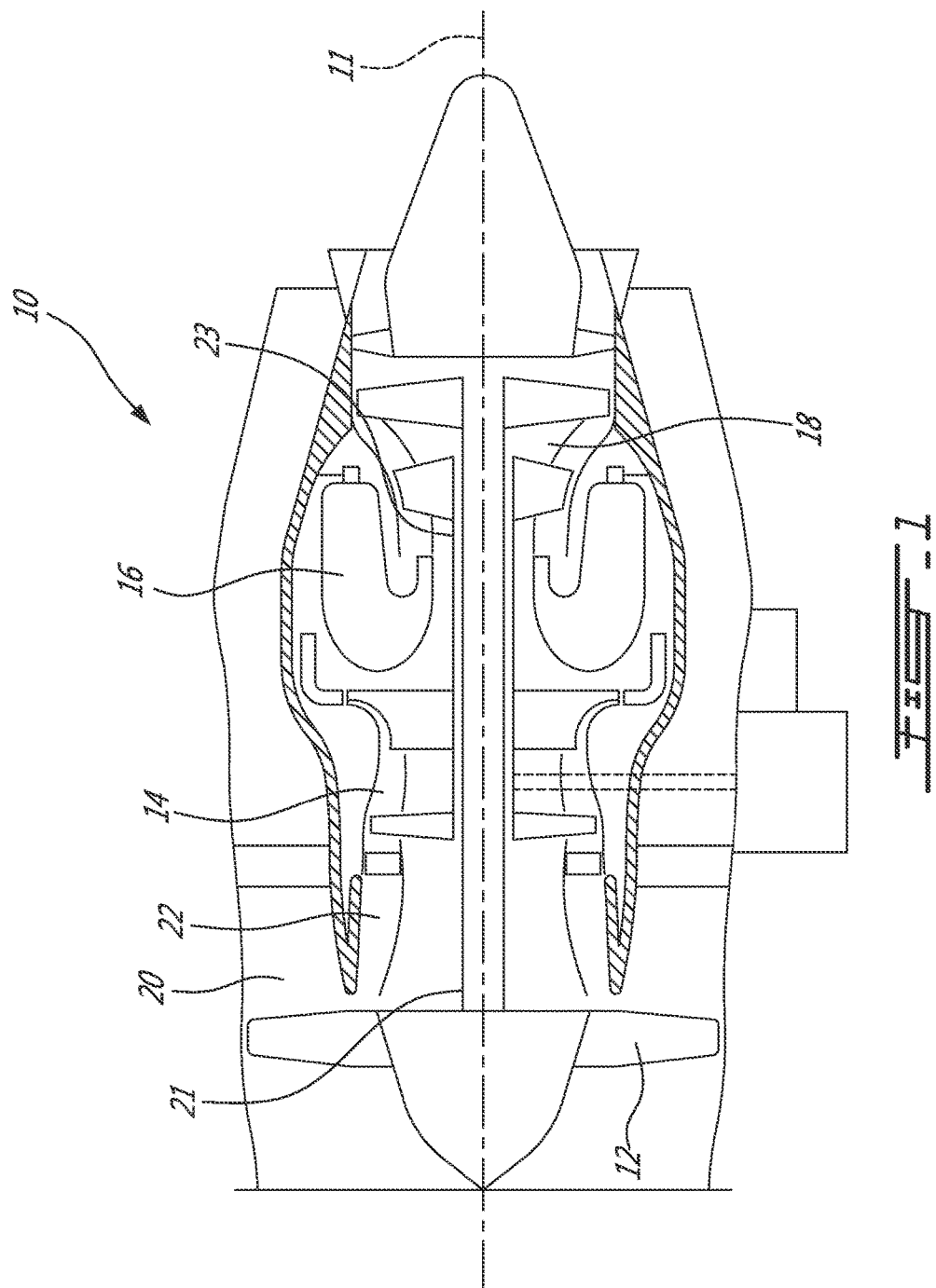
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

The fan 12, the compressors of the compressor section 14, and the turbines of the turbine section 18 are rotary components having a plurality of blades extending across an annular flow path enclosed by an inner wall and an outer wall. The blades are circumferentially interspaced from one another around the rotor, concentric to the annular flow path. During operation, the blades rotate around a main axis 11 of the engine and work with the working fluid which is conveyed in the corresponding annular flow path.

In the case of a turbofan engine such as illustrated in FIG. 1, a first annular flow path 20 is enclosed by a bypass duct whereas another annular flow path 22 travels across the components of the core engine.

Figure 2:
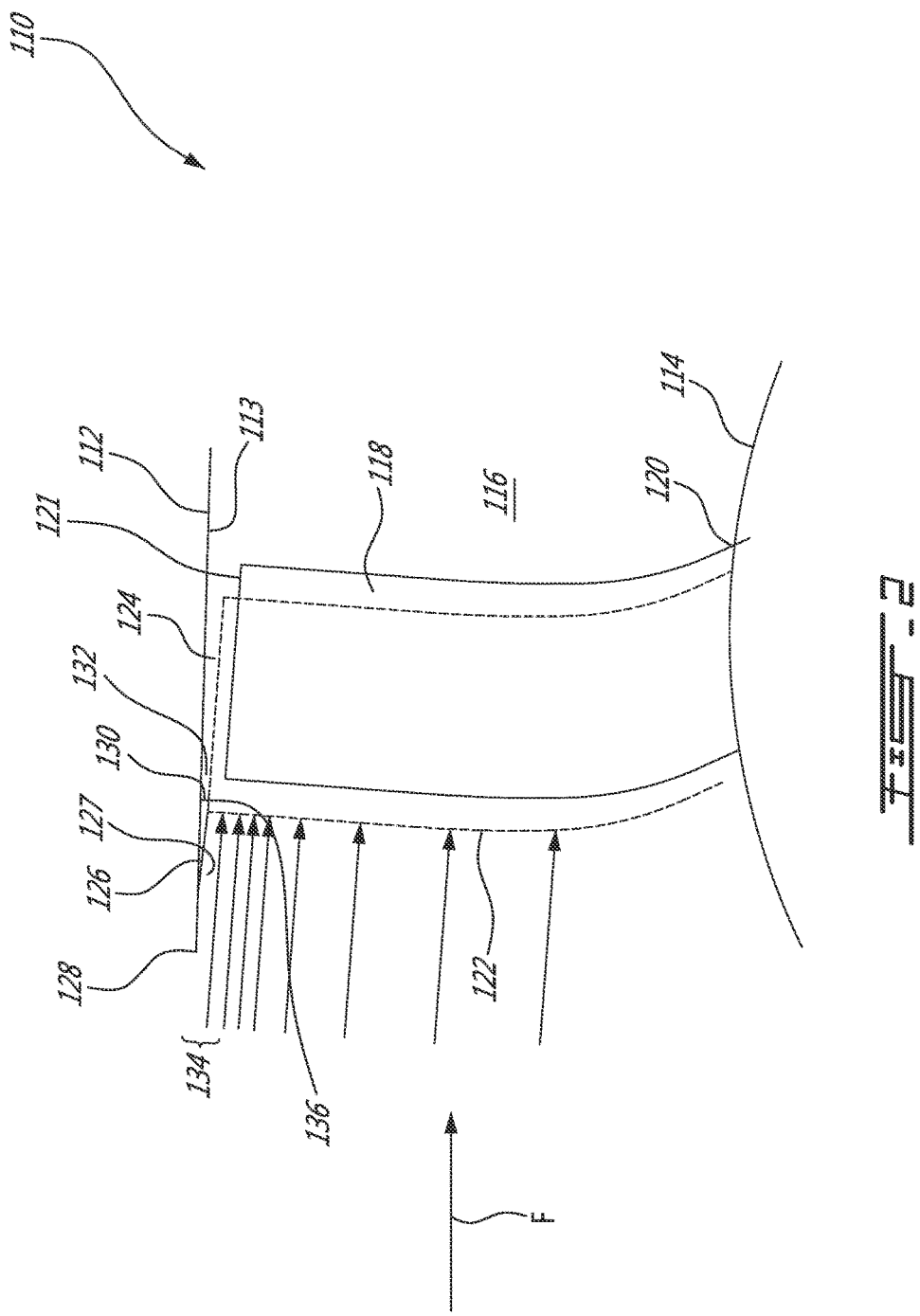
FIG. 2 is a schematic cross-sectional view of part of a rotor assembly, which may be part of a gas turbine engine such as shown in FIG. 1, including a wear member in accordance with a particular embodiment.

FIG. 2 shows a first example of a rotor assembly 110 which can form part of a gas turbine engine, for example such as shown in FIG. 1. In a particular embodiment, the rotor assembly 110 forms part of the fan 12. Alternately, the rotor assembly 110 can be part of the compressor section 14 or the turbine section 18. In another embodiment, the rotor assembly 110 is part of any other appropriate type of device, including, but not limited to, an air conditioning device.

The rotor assembly 110 includes an outer wall 112 and an inner wall 114 enclosing an annular flow path 116. The blades 118 are mounted in a circumferentially interspaced manner to a rotatable shaft (for example, low pressure shaft 21 or high pressure shaft 23 shown in FIG. 1) concentric to the annular flow path 116, and extend radially across the annular flow path 116. In the embodiment shown, part of the inner wall 114 is defined by the platform 120 of each blade 118, which is attached to the rotatable shaft, for example made integral thereto. Each blade 118 includes a tip 121 opposite the platform 120, which extends in proximity of but spaced apart from the outer wall 112. In a particular embodiment, the blades 118 are transonic airfoils.

Upon rotation, the blades 118 define an annular blade path 122 (shown here in dotted lines). During use, due to factors such as centrifugal acceleration, temperature rise, or the like, the blades 118 can grow or otherwise deform from a rest position (shown in full lines) to define the annular blade path 122, such that the radial distance between the annular blade path 122 and the outer wall 112 is smaller than that between the tips 121 of the blades 118 at rest and the outer wall 112. An annular spacing or gap 124 is typically radially defined between the annular blade path 122 and the outer wall 112, though this gap 124 is typically minimized in order to maximize the efficiency of the blades 118. Notwithstanding the desire to minimize the gap, practical factors tend to pose a practical limit to minimizing the thickness of the gap.

The assembly 110 includes a flow diverting device upstream of the blades 118, which in the particular embodiment shown is a wear member 126 extending from the inner surface 113 of the outer wall 112. In a particular embodiment, the wear member 126 extends continuously around an entire circumference of the outer wall 112. In another embodiment, the wear member 126 includes a circumferential array of arcuate sections in contact with one another to form a continuous annulus around the circumference of the outer wall 112.

The wear member 126 is made of material abradable by that of the blades 118, such as, but not limited to, a wearable polymer. In this example, the wear member 126 generally has a wedge-shaped cross-section which broadens from a leading edge or upstream end 128 to a broader trailing edge or downstream end 130, forming a radially defined step 132 at an upstream end of the annular gap 124. The downstream end 130 of the wear member 126 thus extends across the annular gap 124 at the upstream end thereof, and the inner surface 127 of the wear member 126 forms a slope directed radially inwardly along the direction of flow F in the flow path 116.

In use, the wear member 126 thus deflects the flow adjacent the outer wall 112 radially inwardly and away from the annular gap 124 at a location immediately upstream of the blades 118. In this example, the wear member 126 has the effect of progressively reducing the diameter of the annular flow path 116 immediately upstream of the annular blade path 122, thus compressing the radially-outer portion 134 of the flow, which includes the boundary layer, in the radial orientation. In a particular embodiment, the wear member 126 converges the boundary layer and accordingly reduces its radial dimension, which may help reduce flow losses in the rotating blades 118, and/or reduce the adverse pressure effect which may cause flow separation, and/or energize the boundary layer. Moreover, the wear member 126 deflects the radially-outer portion 134 of the flow into the annular blade path 122, away from the gap 124. This may reduce or eliminate the flow which otherwise avoids the rotating blades 118 by circulating through the gap 124, which may help efficiency of the rotor assembly by reducing or eliminating this bypassing part of the flow which otherwise produces no or minimal work with the blades 118. In a particular embodiment, the wear member 126 allows for the reduction of tip vortices, which may reduce blade vibration and the occurrence of flutter. In a particular embodiment, the wear member 126 allows for a reduction or minimization of shock entropy.

In the embodiment shown, the trailing end 130 of the wear member 126 protrudes into the gap 124 and a radially-inner edge 136 of the wear member 126, which will be referred to herein as the interference edge, is configured to come into interference with the annular blade path 122 in a manner that during use, a portion of the interference edge will be worn, or abradably shaped, by the leading edge of the blades 118, and thus cooperate therewith to seal the gap 124. The wear pad 126 can be assembled to the outer wall 112 in cold conditions, and the use of wearable material helps obtain an efficient fit with the rotating blades 118 during use. In a particular embodiment, the wear member 126 is connected to the outer wall 112 such as to be readily removable and replaced, for example to replace the wear member 126 if its wear reduces the efficiency of the seal beyond a predetermined threshold.

In a particular embodiment, the wear pad 126 includes staggered sections that enable the ability to take into account the inlet conditions of the nacelle under all operations. Also, the sections are staggered to adjust for staggered blades and direct the flow accordingly.

In a particular embodiment, the wear member 126 may be shaped to also deflect the flow circumferentially, for example by including grooves and/or ribs angled or curved such that their upstream and downstream ends are circumferentially offset from one another.

Figure 3:
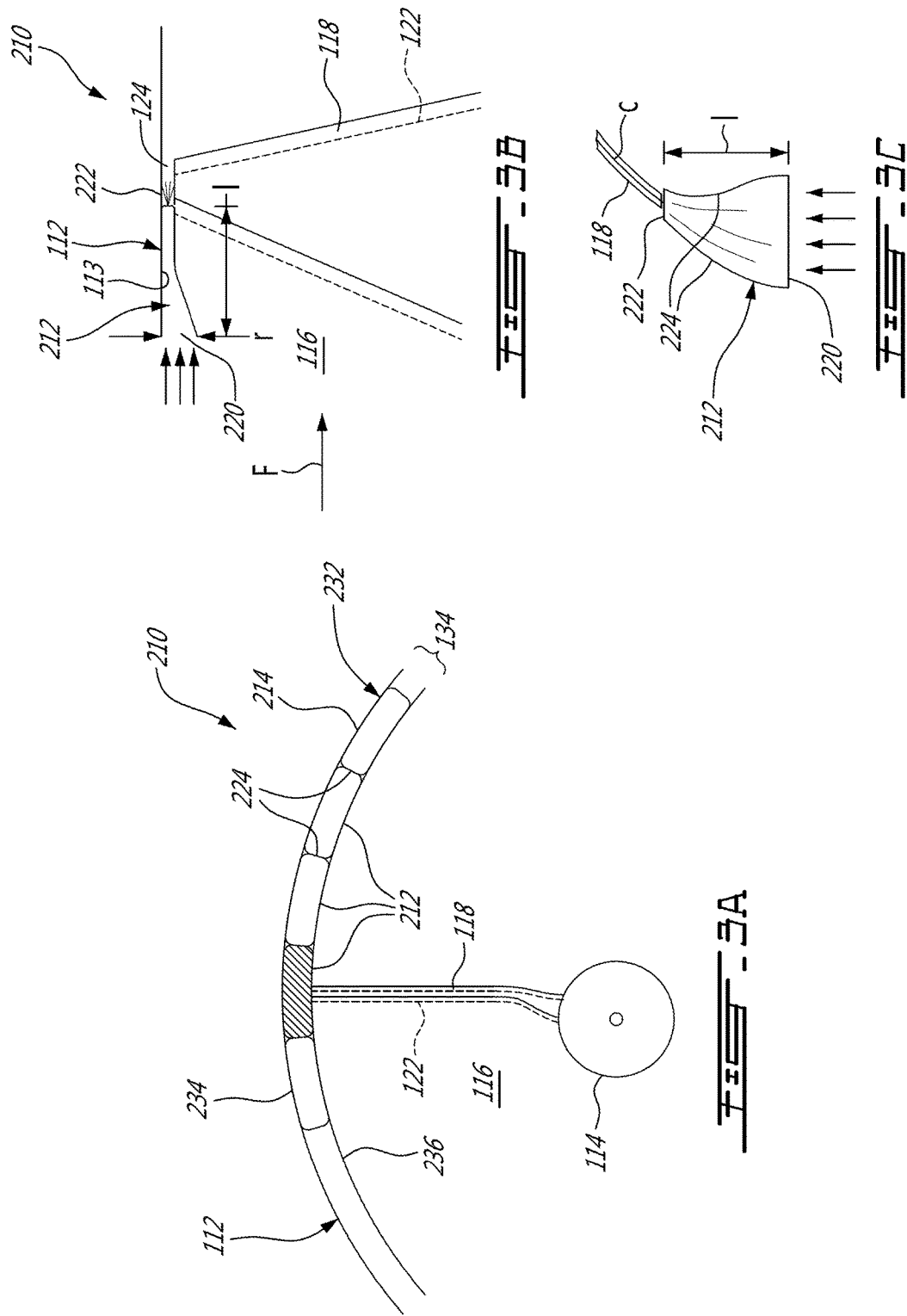
FIGS. 3A, 3B and 3C are schematic front, side, and top cross-sectional views, respectively, of part of a rotor assembly, which may be part of a gas turbine engine such as shown in FIG. 1, including an array of scoops in accordance with another particular embodiment.

FIGS. 3A, 3B, and 3C show a rotor assembly 210 with another type of flow diverting device upstream of the blades 118, which in the particular embodiment shown is a plurality of scoops 212 disposed in a circumferential array or ring configuration 214 along the radially-outer portion 134 of the annular flow path 116. The scoops 212 each have a length l extending between an inlet 220 and an outlet 222, the inlet 220 and the outlet 222 being axially spaced apart. The outlet 222 of each scoop 212 is upstream of and adjacent the annular blade path 122. The scoops 212 extend from the inner surface 113 of the outer wall 112 along a radial distance r smaller than the radial distance between the inner and outer walls 114, 112. In a particular embodiment, less than 1% of the main flow circulates through the scoops 212; in another embodiment, between 1% and 2% of the main flow circulates through the scoops 212. The scoops 112 form closed channels in a full encasement construction from the inlet 220 to the outlet 222. In another embodiment, the scoops 212 communicate with another source of flow than the flow path 116, such that the flow through the scoops 212 is partially or completely provided by this other source.

In a particular embodiment, the scoops 212 transform the outer portion 134 of the flow of the annular flow path 116 into a more laminar flow as the flow circulates from the inlet 220 to the outlet 222. The scoops 212 are located relatively close to the annular blade path 122, such as to avoid having the flow exiting the outlets 222 becoming turbulent again before reaching the blades 118. In a particular embodiment, the outlets 222 are located immediately adjacent the upstream end of the annular blade path 122, or even in interference therewith, as detailed further below. In another embodiment, the outlets 222 are located upstream of the upstream end of the annular blade path 122, at an axial distance from the upstream end of the annular blade path 122 corresponding to at most the length of the cord c of a blade 118. Other configurations are also possible.

In the embodiment shown, the scoops 212 are positioned in an edge-to edge relationship to one another, with adjacent scoops 212 being separated by a common lateral wall 224. In a particular embodiment, the scoops 212 are provided as a ring segment 232 which can be shaped as an arc and cover a portion of the circumference of the outer wall 112, or as a ring and cover the entire circumference of the outer wall 112. The ring segment 232 can have an outer wall 234 secured to the outer wall 112 of the annular flow path 116, or the outer wall 112 of the annular flow path 116 can define the outer wall 234 of the ring segment 232. The scoops 212 of the ring segment have a common inner wall 236.

In a particular embodiment, the inlet 220 and/or outlet 222 has a rounded, for example oval, shape. In another particular embodiment, each lateral wall 224 may be defined by a vane extending between the inner and outer walls 236, 234 of the ring segment 232. The vanes may have a fixed orientation with respect to the axial direction, or in another embodiment may be variable vanes, such as to be able to circumferentially change their orientation with respect to the axial direction in correspondence with particular flow conditions, for example through a pivotal connection with the inner and outer walls 236, 234.

In another embodiment, the scoops 212 may be individually defined, for example as individual pipes extending in side-by-side relationship.

Each of the scoops 212 has a cross-sectional area reducing from its inlet 220 to its outlet 222. As shown in FIG. 3B, in this example, the scoops 212 narrow radially along their length l to concentrate or compress the flow in the radial orientation. In a particular embodiment, the reducing radial dimension of the scoops 212 reduces the radial dimension of the boundary layer, and such compression may help reduce flow losses in the rotating blades 118, and/or reduce the adverse pressure effect which may cause flow separation, and/or energize the boundary layer. Moreover, as shown in FIG. 3C, the scoops 212 narrow circumferentially along their length l, to concentrate or compress the flow also in the circumferential orientation, forming nozzles from which a jet of the fluid is outputted during use. Other configurations are also possible.

In this embodiment, the outlet 222 of each scoop 212 is directed toward the annular gap 124 between the blade path 122 and the outer wall 112, such as to define nozzles aimed to direct the jets of outputted fluid into the gap 124, the jets being directed in a particular embodiment along a direction allowing to reduce or minimize losses within the gap 124. Alternately, the outlet 222 of each scoop 212 may be directed into the blade path 122 and away from the gap 124, for example by having the outlet 222 of each scoop 212 offset radially inwardly from its inlet 220. In a particular embodiment, directing the flow into the gap 124 allows to improve or optimize the angle of incidence of the flow and the efficiency of the blades 118, and/or reduce shock entropy.

In the embodiment shown, the scoops 212 are shaped in a manner to turn the flow circumferentially between the inlet 220 and the outlet 222, simultaneously to the action of concentrating the flow into a jet. More specifically, the outlet 222 of each scoop 212 is circumferentially offset from its inlet 220, and the lateral wall 224 (which may be vanes or other types of wall members) are curved such as to swirl the flow circumferentially, deviating the flow from the axial direction at the inlet 220 to an angled direction at the outlet 222. In a particular embodiment, the flow direction defined by the outlet 222 of each scoop 212 is aligned with an orientation of the chord c of each blade 118.

In another embodiment, the outlet 222 of each scoop 212 is circumferentially offset from its inlet 220, but the lateral walls 224 (which may be vanes or other types of wall members) are straight. In another embodiment, each scoop 212 extends along the axial direction.

In another embodiment, the lateral walls 224 may be eliminated and one continuous scoop can extend around 360 degrees; the material properties (stiffness, dampening) of the material forming the scoop are selected such as to obtain a desired open effective aerodynamic area of the scoop inlet.

In a particular embodiment, the inner wall 236 of the scoops 212 is made of or includes wearable material abradable by that of the blades 118 at least adjacent the outlet 222, and extends in interference with the annular blade path 122. Accordingly, the rotating blades 118 can sealingly engage the outlet 222 of the scoops 212 through wear of the wearable material. In another embodiment, the scoops 212 are completely defined in wearable material, for example as channels defined in a wear pad such as shown in FIG. 2.

In use and according to a particular embodiment, the scoops 212 separate the outer portion 134 of the flow of the annular flow path 116 from the central portion of the flow, and deflect this outer portion of the flow circumferentially toward the orientation of the blade chords c in a location immediately upstream of the blades 118. In a particular embodiment, the flow is deflected to be closer to the orientation of the blade chords c without matching it; in another embodiment, the flow is deflected such as to have an orientation corresponding to that of the blade chords c. In a particular embodiment, such reorientation of the flow increases the effectiveness of the blades 118. In a particular embodiment, such reorientation of the flow "pushes" the shock toward the trailing edge of the blade 118 and away from the leading edge, which may reduce shock losses.

In a particular embodiment, the concentration and/or reorientation of the flow in the scoops 212 reduce tip vortices which allow for a reduction of blade vibration and the occurrence of flutter.

Figure 4:
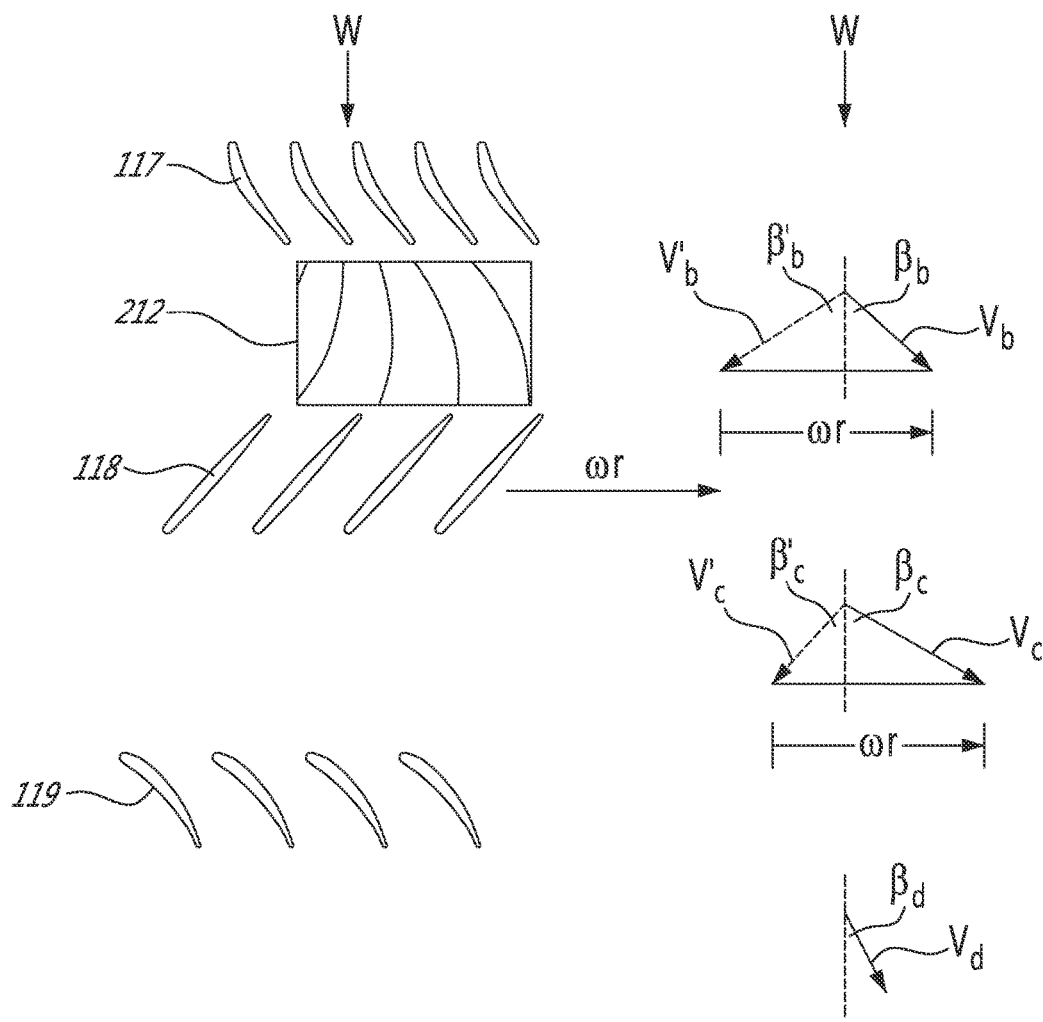
FIG. 4 is a schematic view showing the influence of scoops such as shown in FIGS. 3A, 3B and 3C in a rotor assembly, in accordance with another particular embodiment.

Referring to FIG. 4, in a particular embodiment, the rotor assembly includes a circumferential array of inlet guide vanes 117 located upstream of the blades 118, and a circumferential array of static stator blades 119 located downstream of the blades 118. In this Figure, the absolute air speed is indicated as Vb, Vc, Vd (at respective angle βa, βb, βc), the relative air speed is indicated as V'b, V'c, V'd (at respective angle β'a, β'b, β'c), the rotational speed of the blades 118 is shown as ωr, and the speed of the flow entering the inlet guide vanes 117 is shown as w. It can be seen that the scoops 212, which are positioned between the inlet guide vanes 117 and the blades 118, turn the flow such that the direction of the absolute air speed minimizes shocks and maximizes stage efficiency.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:

1. A gas turbine engine comprising:
   concentric inner and outer walls enclosing an annular flow path;
   a plurality of blades extending radially across the annular flow path, the blades defining an annular blade path upon rotation with an annular gap being radially defined between the annular blade path and the outer wall; and
   a plurality of scoops disposed in a circumferential array, the scoops extending from an inner surface of the outer wall along a radial distance smaller than a radial distance between the inner and outer walls, each of the scoops having an inlet and an opposed outlet axially spaced from one another, the outlet of each of the scoops being upstream of and adjacent the annular blade path and being directed toward the annular gap;
   wherein a radially innermost surface of the plurality of scoops includes wearable material wearable by the blades, and extends in interference with the annular blade path.

2. The gas turbine engine of claim 1 wherein each of the scoops has a cross-sectional area reducing from the inlet to the outlet.

3. The gas turbine engine of claim 1 wherein the inlet and outlet of each of the scoops are circumferentially offset from one another.

4. The gas turbine engine of claim 3, wherein a flow direction defined by the outlet of each of the scoops is aligned with an orientation of a chord of each of the blades.

5. The gas turbine engine of claim 1 wherein the radially innermost surface of the plurality of scoops is defined by a common annular wall.

6. The gas turbine engine of claim 5 wherein the plurality of scoops, inlets and outlets are defined between adjacent ones of circumferentially spaced apart vanes extending radially outwardly of the common annular wall.

7. The gas turbine engine of claim 6 wherein the plurality of vanes have a variable orientation.

8. The gas turbine engine of claim 1 wherein the blades are part of a fan of the gas turbine engine.

9. A rotor assembly comprising:
concentric inner and outer walls enclosing an annular flow path;
a plurality of rotatable blades extending radially across the annular flow path, the blades defining an annular blade path upon rotation with an annular gap being radially defined between the annular blade path and the outer wall; and
a plurality of scoops disposed in a circumferential array, the scoops extending from an inner surface of the outer wall along a radial distance smaller than a radial distance between the inner and outer walls, each of the scoops forming a closed channel from an inlet to an outlet with the inlet and outlet being axially spaced from one another, the outlet of each of the scoops being upstream of and adjacent the annular blade path and being directed toward the annular gap;
wherein a radially innermost surface of the plurality of scoops includes wearable material wearable by the blades and extending in interference with the annular blade path.

10. The rotor assembly of claim 9 wherein each of the scoops has a cross-sectional area reducing from the inlet to the outlet.

11. The rotor assembly of claim 9 wherein the inlet and outlet of each of the scoops are circumferentially offset from one another, and wherein a flow direction defined by the outlet of each of the scoops is aligned with an orientation of a chord of each of the blades.

12. The rotor assembly of claim 9 wherein the radially innermost surface of the plurality of scoops is defined by a common annular wall including the wearable material.

13. The rotor assembly of claim 9 wherein the radially innermost surface of the plurality of scoops is defined by a common annular wall and wherein the plurality of scoops, inlets and outlets are defined between adjacent ones of circumferentially spaced apart vanes extending radially outwardly of the common annular wall.

14. The rotor assembly of claim 13 wherein the plurality of vanes have a variable orientation.

15. A method of reducing tip vortices in a rotor assembly having an array of blades rotatable in an annular flow path surrounded by an outer wall, the method comprising:
separating an outer portion of a flow through the annular flow path from a central portion of the flow, the outer portion of the flow circulating along the annular outer wall through scoops;
deflecting the outer portion of the flow circumferentially within the scoops toward an orientation of chords of the blades in a location immediately upstream of the blades; and
upon rotation of the blades, sealingly engaging the blades with a radially innermost surface of the scoops through wear of the radially innermost surface by the blades.

16. The method of claim 15, further comprising, simultaneously to said deflecting, concentrating the outer portion of the flow through circulation through the scoops having a reducing cross-section.

17. The method of claim 16 wherein said concentrating includes forming a plurality of output jets associated with corresponding outlets of the scoops, and directing said output jets into an annular gap formed between the outer wall and an annular blade path defined by the blades upon rotation.

* * * * *